United States Patent Office 3,159,941
Patented Dec. 8, 1964

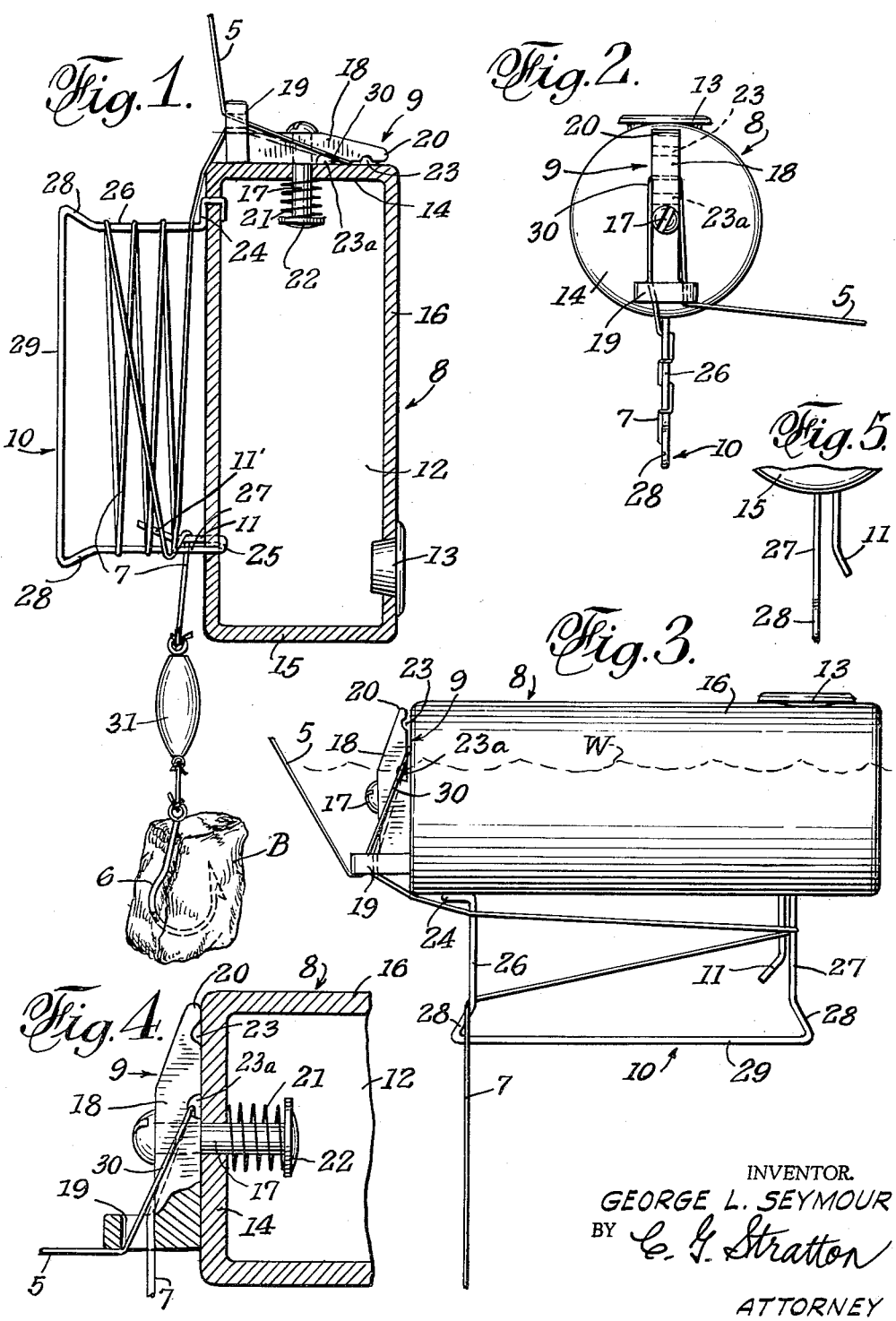

3,159,941
FISHING FLOAT
George L. Seymour, P.O. Box 384, Big Bear Lake, Calif.
Filed Mar. 11, 1963, Ser. No. 264,178
4 Claims. (Cl. 43—43.11)

This invention relates to a fishing float that facilitates casting and subsequent fishing at a desired depth.

An object of the invention is to provide a fishing float or bobber for winding a leader or snell thereon in a manner to hold the baited hook closely adjacent to the float to facilitate casting, and for providing for automatic unwinding of the leader after the float strikes the water to lower said hook to a depth as predetermined when the leader is being wound.

Another object of the invention is to provide a fishing float, as above characterized, that facilitates line winding or wrapping and provides substantially instant locking of the bobber portion to the line upon completion of the wrapping, thereby saving time between casts.

A further object of the invention is to provide a fishing float of the character referred to that instantly releases the connection between the bobber and the line after a strike or when reeling in the replace lost bait, to enable the hook to be brought in close adjacency to the end of the fish pole to facilitate handling of the hook and/or the fish on said hook.

A still further object of the invention is to provide a fishing float that may be easily removed from a fish line and as easily connected, all without knotting or untying of the line.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a longitudinal sectional view of a fishing float according to the invention and shown in the condition thereof preparatory to casting.

FIG. 2 is an end elevational view as seen from the top of FIG. 1.

FIG. 3 is a side elevational view of the fishing float in its floating position after casting and with the hook-provided leader portion of the line in the process of unwinding.

FIG. 4 is an enlarged and fragmentary sectional view showing the line-releasing position of the device.

FIG. 5 is a fragmentary elevational view as seen from the bottom of FIG. 1.

The fishing float that is illustrated is connected to a fishing line 5, at the end of which is provided a fishhook 6, here shown as provided with bait B. For the purposes of this disclosure, the end of the line 5 adjacent to the hook is designated 7 and will be termed herein the leader portion of the line 5. It will be understood that the line 5 extends from the end of a fish pole which may be provided with a reel on which the line is wound, all in a conventional manner.

The fishing float that is illustrated comprises, generally, a bobber 8, a line-gripping and -releasing clip 9 on one end of said bobber, a winding frame 10 affixed to said bobber on which the leader portion 7 of the line 5 between the clip 9 and the hook 6 is adapted to be wound, and a leader-locking hook 11 to hold the wound-up leader portion 7 on the frame 10 before and during casting, the same releasing the leader portion 7 to automatically unwind from the frame 10 when the bobber strikes the water W and assumes a horizontal floating position, thereby allowing the baited hook 6 to sink to a depth according to the length of the leader portion 7 from the point of gripping thereof by the clip 9.

The bobber 8 is buoyant and may be formed as a solid but buoyant cylindrical or similarly shaped member, or, as shown, as a hollow buoyant member, regardless how fabricated. The hollow bobber is preferred, since the interior 12 thereof may be used to hold a quantity of water as ballast to improve casting distance. A plug 13 gives access to the interior 12 for adding or removing ballast liquid, as desired. As shown, the bobber is formed with end walls 14 and 15 and with a connecting cylindrical wall 16.

The clip 9 is connected by a stud 17 to the end wall 14 of the bobber and is shown as a member having an elongated body 18 with a line-reeving eye 19 at one end and a rounded nose 20 at the other. The stud 17 extends through the approximated middle of said body and, inward of the wall 14, a compression spring 21 around said stud, by engagement between a head 22 on the stud and said wall, resiliently biases the clip body 18 into engagement with the outer face of said bobber wall 14. In the face of the body 18, between the stud 17 and the nose 20, there are provided notches 23 and 23a, the former nearer the nose and the latter nearer the stub.

The leader-winding frame 10 is shown as a length of wire connected at one end 24 to the cylindrical wall 16 of the bobber adjacent to the end wall 14, and at its other end 25 to said cylindrical wall 16 adjacent to the bobber wall 15. Radial wire extensions 26 and 27 extending respectively from the wire ends 24 and 25, are first oppositely angularly bent, as at 28, and then connected by a wire length 29. The frame 10 is thus provided with a bail-like form that constitutes a flat winding frame in which the flared bends 28 aid in holding wound line on the frame.

The leader-locking hook 11 is shown as a portion of the wire that makes up the frame 10, although the same may be provided as a separate element extending from the bobber wall 16 between the extension 27 of the frame and the bobber end wall 15. The hook 11 is provided with an inwardly directed end 11' to engage the leader portion 7 in a manner to retain the same from slipping off the frame 10 until the bobber assumes its floating position, as in FIG. 3.

In the portion of line 5 that will provide the length of the leader portion 7 according to the fishing depth desired, a loop 30 is formed. This loop is then passed through the eye 19 from the lower end of the clip 9 and dropped over the nose 20 of said clip. The same is pulled until the bight of the loop enters the notch 23 to free the line so the same may be pulled in one direction or the other until the proper length from the clip to the fish hook is achieved. Then the loop is pulled to draw the bight thereof between the bobber wall 14 and the clip, thereby causing frictional gripping of the loop by the spring-biased clip. In this manner, the portion 7 of the line becomes a leader or snell of predetermined length.

Now, this leader portion 7 is wound over the frame 10, as shown, and its end, adjacent the fishhook 6, is trained under and around the extension 27 and then upwardly and around the locking hook 11 between its end 11' and bobber wall 16. So long as the bobber 8 is held suspended from line 5, as shown in FIG. 1, the fishing float is thus prepared for casting.

A conventional sinker 31 may be interposed between the hook 6 and the leader 7. The use of the same in nowise affects the present invention but merely weights the baited hook in the usual way. In any case, with or without a sinker, the baited hook will hang pendent from the frame 10, as shown.

Now, the prepared float may be drawn toward the end of the fishing pole. Then, as the cast is made, the line 5 is released to pay out freely and allow the float to be cast in an easy, non-snarling manner. Centrifugal force will hold the leader engaged with the hook during casting.

When the bobber strikes the water, it will settle on its side with the frame 10 down, due to the frame, baited hook and sinker. As a consequence, the leader 7 will first slip off the hook end 11' and then, turn-by-turn, unwind or drop off the frame 10. This condition is shown in FIG. 3. When the leader has fully unwound from the frame, the baited hook 6 will hang from the bobber 16 from the point where the bight of loop 30 is gripped.

If a fish strikes or the hook is to be drawn in for any reason, the line 5 is reeled in until the bobber encounters the end of the fishing rod or pole. Continued reel-in of said line will cause the bight of loop 30 to be drawn into the notch 23a, freeing the line for continued reeling in, but not effecting release of the bobber from the line. Now, a caught fish may be removed from the hook and the latter re-baited, either before or after the line is wound on the frame 10.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A fishing float comprising:
    (a) a hollow elongated and cylindrical, buoyant body constituting a bobber, said body having an end wall,
    (b) a clip connected to said end wall and resiliently biased thereagainst to clamp a fish line against said end wall and thereby connect said bobber to the line,
    (c) means providing a notch in one end of the clip into which the fish line is adapted to be slipped to enable free movement of the bobber along the line to vary the length of the line beyond the clip, as desired, upon clamping of the line to the bobber, the line contained within and extending beyond the clip constituting a leader and having a fish hook on its end,
    (d) an eye formed in the opposite end of the clip and through which a doubled portion of the leader is reeved, a part of said doubled portion engaging the aforesaid notch,
    (e) a flat frame extending radially from the bobber and around which the leader is adapted to be wound, and
    (f) a hook adjacent the end of the bobber opposite to the end mounting the clip and constituting a member around which the leader, adjacent its hook end, is adapted to be trained and off which the leader is adapted to slip upon the bobber assuming a horizontal water-borne position after a cast of the float.

2. A fishing float according to claim 1 in which a second notch is provided in the clip inward of the first notch with relation to the end of the clip having the latter notch, the second notch providing for release of the fish line from clamping engagement during reeling-in of the line after a cast.

3. A fishing float according to claim 1 in which the clip has a flat clamping face that cooperates with the end wall of the bobber to clamp the line in a non-pinching frictional engagement.

4. The float of claim 1 in which the clip element (b) is spring-biased.

References Cited by the Examiner

UNITED STATES PATENTS

| | | | |
|---|---|---|---|
| 1,885,311 | 11/32 | Whitcomb | 43—43.11 |
| 1,918,507 | 1/33 | Westling | 43—43.11 |
| 2,535,907 | 12/50 | Dolejs | 43—44.92 |
| 2,563,560 | 8/51 | Stafford | 43—44.92 |
| 2,683,325 | 1/54 | Sharp | 43—43.14 |
| 2,911,754 | 11/59 | Mills | 43—43.11 |
| 2,915,847 | 12/59 | Hancock | 43—43.11 |

ABRAHAM G. STONE, *Primary Examiner.*